United States Patent [19]

Dosmo et al.

[11] Patent Number: 5,557,498
[45] Date of Patent: Sep. 17, 1996

[54] SWITCHING APPARATUS INCLUDING A DISPLACEABLE DISCONNECTING DEVICE AND AN AUXILIARY CIRCUIT

[75] Inventors: Renato Dosmo; Giovanni Mairati, both of Bergamo, Italy

[73] Assignee: ABB Sace SpA, Bergamo, Italy

[21] Appl. No.: 230,919

[22] Filed: Apr. 21, 1994

[30] Foreign Application Priority Data

Apr. 21, 1993 [IT] Italy .................................. MI93A0787
Apr. 21, 1993 [IT] Italy .................................. MI93A0786

[51] Int. Cl.$^6$ ............................... H02B 1/00; H01H 9/00
[52] U.S. Cl. ...................... 361/600; 361/673; 200/50.01
[58] Field of Search ............................... 200/50 R–50 C, 200/293–307, 50.1–50.4; 361/600, 601, 622–627, 636, 640, 656, 673

[56] References Cited

U.S. PATENT DOCUMENTS

| | | | |
|---|---|---|---|
| 4,218,596 | 8/1980 | Clausing | 200/144 R |
| 4,356,368 | 10/1982 | Osika | 200/307 |
| 4,595,812 | 6/1986 | Tamaru et al. | 200/307 |
| 4,703,137 | 10/1987 | Bohnen et al. | 200/50 AA |
| 4,868,715 | 9/1989 | Putman et al. | 248/27.1 X |
| 4,870,531 | 9/1989 | Danek | 335/18 X |
| 5,001,315 | 3/1991 | Runyan et al. | 200/307 |

Primary Examiner—J. R. Scott
Attorney, Agent, or Firm—Burns, Doane, Swecker & Mathis

[57] ABSTRACT

The switching apparatus includes a stationary part (10) which is arranged in a switch cabinet and includes electrical power supply terminals (18) and electrical power distribution terminals (19). A moving housing body (20) accommodates a switch mechanism (27) and a disconnecting device for electrically connecting and disconnecting the housing body (20) from the stationary part (10). An additional device with an electrical auxiliary circuit is attached to the housing body (20) and is supplied with electrical power by wiring which is passed from the stationary part (10) to the housing body (20). The wiring includes mutually interacting plug connections (105, 107; 106, 108) which are positioned in the side walls (11) of the stationary part (10) and the side walls (A) of the housing body (20). The mutually interacting plug connections open when the housing body and stationary part are disconnected by the disconnecting device and close when the housing body and stationary part are connected by the disconnecting device. The switching apparatus can be accommodated in a switch cabinet in an extremely space saving manner.

13 Claims, 4 Drawing Sheets

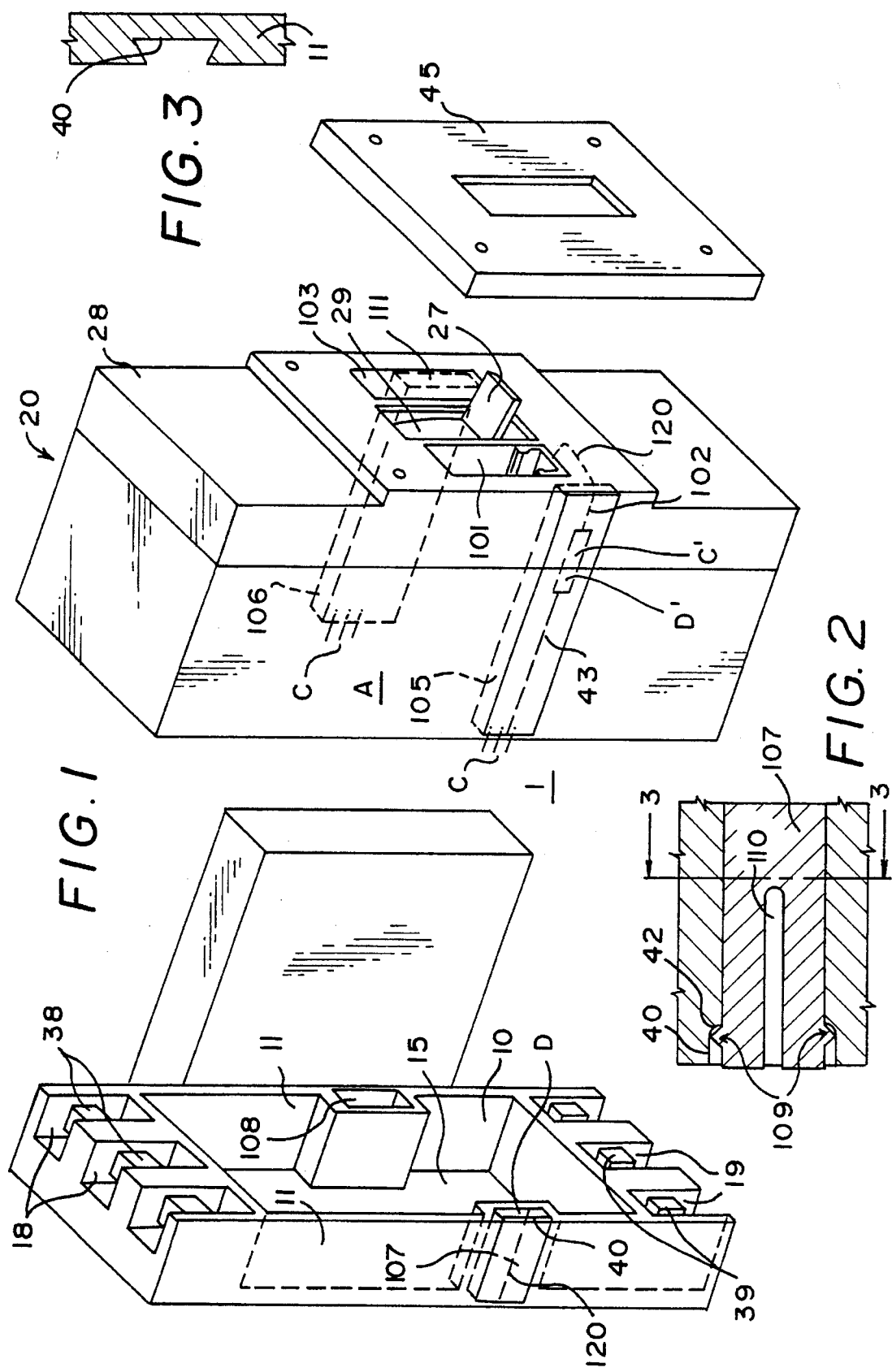

5,557,498

SWITCHING APPARATUS INCLUDING A DISPLACEABLE DISCONNECTING DEVICE AND AN AUXILIARY CIRCUIT

BACKGROUND OF THE INVENTION

1. Field of the Invention

The invention relates to a switching apparatus including a displaceable disconnecting device and an auxiliary circuit. More particularly, the invention relates to a low-voltage power switch, having a stationary part, a moving housing body attached to the stationary part and an additional device with an electrical auxiliary circuit which is supplied with electrical power from the stationary part.

2. Discussion of Background

Such a switching apparatus is preferably a low-voltage power switch having rated currents between 100 A and several kA. The switching apparatus is normally arranged in a switch cabinet and can assume a disconnected position or a connected position. The connected position and disconnected position in this case mean a position of the switching apparatus in which a housing body, which includes the power contacts of the switching apparatus, is DC connected or is disconnected, respectively, from contact pieces for the electrical power supply and for the electrical power distribution. These contact pieces are located in a stationary part of the switching apparatus, said part being mounted in a switch cabinet.

Additional devices, such as auxiliary signalling contacts, overcurrent and/or overvoltage protection devices, and/or control devices which have auxiliary circuits and must be wired to electrical power supply circuits of the switch cabinet are mounted in the switching apparatus. The wires which are required for this purpose are normally guided on a side surface of the preferably box-shaped switch housing and thus form a wire harness which must be connected to a plug socket, which is provided in the switch cabinet, during disconnection or connection of the switching apparatus. However, in this case it is necessary to release the connection of the cables manually during disconnection or connection. Such a wire harness represents an obstruction for a fitter during installation or servicing of the switch cabinet since, while carrying out a specific sequence of operations, he must always be careful that the wires which become free are not torn off or damaged. Furthermore, there is additional risk of the auxiliary circuits possibly being live.

SUMMARY OF THE INVENTION

Accordingly, one object of the invention is to provide a novel switching apparatus of the type mentioned initially which is distinguished by a small space requirement and can at the same time be serviced and installed without any problems.

The switching apparatus according to the invention can be accommodated in the switch cabinet in an extremely space-saving manner. This is a result of the fact that the wires which ensure the electrical power supply to the additional devices are built into the housing of the switching apparatus and the fact that during connection and disconnection of the switching apparatus, the wires are automatically connected to an electrical power source and disconnected therefrom respectively, and there is thus no longer any need for space for wiring tasks which have to be carried out manually.

It is particularly advantageous that the moving housing body 20 can be serviced without it being possible to make direct contact with the main circuits. Furthermore, the space requirement for a plurality of switching apparatuses 1, arranged side by side in an installation, is reduced.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows a perspective illustration of the switching apparatus according to the invention, in components are disconnected from one another, FIG. 2 shows a view of a section through a connecting part, which is held in a seat, of the switching apparatus according to FIG. 1, FIG. 3 shows a view of a section along the line 3—3 of the seat according to FIG. 2.

DESCRIPTION OF THE PREFERRED EMBODIMENTS

Figure 4:
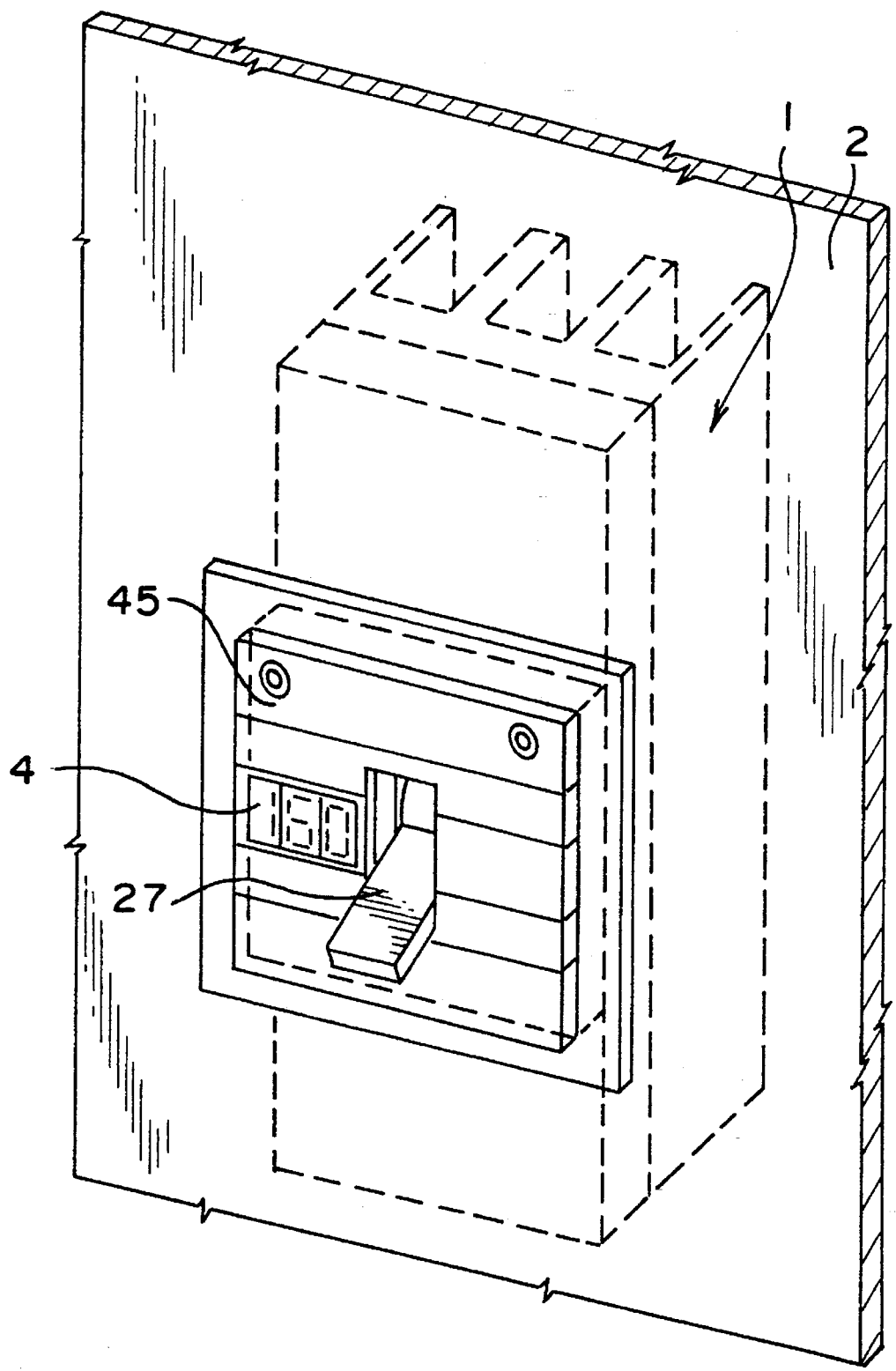
FIG. 4 shows a perspective view of the switching apparatus according to FIG. 1, having an additional device which is constructed as an ammeter.

Referring now to the drawings, wherein like reference numerals designate identical or corresponding parts throughout the several views, FIG. 1 illustrates an embodiment of a switching apparatus 1 according to the invention, having a stationary part 10 and a moving housing body 20, wherein the part 10, the moving housing body 20 and a cover 45 of the moving housing body 20 are disconnected from one another. The stationary part 10 has recesses 18 and 19 respectively at the top and bottom respectively for connecting terminals 38, 39, which are shown in general configuration in FIG. 1, and can be connected to an electrical power source or to an electrical load. A space 15 which is bounded by sidewalls 11 is cut out in the center of the stationary part 10, in which space a stationary part of a disconnecting device is accommodated. The disconnecting device which is not illustrated causes displacement of the housing body 20 in the switching apparatus 1 produces a disconnection point (disconnected position) or a DC connection between the stationary part 10 and the housing body 20 (connected position).

The actual switch mechanism, with power contacts and a drive, is accommodated in the moving housing body 20. In order to simplify the illustration, only one of the switching levers 27 which are used for operating the switching apparatus 1 is indicated, which switching lever 27 projects out of an opening 29 which is provided in the center of a front cover 28. Additional devices, which are not illustrated in FIG. 1, with auxiliary circuits are illustrated in recesses 101 and 103, which, provided on the sides of the opening 29, in the front cover 28. Such additional devices may be undervoltage trip devices which are accommodated in the recess 101, and auxiliary contacts and/or auxiliary contacts and a tripping relay which are accommodated in the recess 103.

The cover 45 is fastened on the front cover 28 with the aid of screws. The cover 45 is constructed such that it enables access only to the switching lever 27 from the outside and covers the recesses 101 and 103 which accommodate the electrical additional devices.

A seat 40, in the form of a groove, is formed in the sidewall 11 of the stationary part, in order to accommodate a connecting part 107 including a socket D, which is constructed as a plug socket. This connecting part 107 is electrically connected to the terminals 38, which can be connected to the external electrical power source. A connecting part 105, which includes a plug C and can be electrically connected to the auxiliary circuit of one of the additional devices, is accommodated in a groove-shaped seat 43 in a sidewall A, which is aligned with the sidewall 11, of the moving housing body 20 which is constructed in the form of a box. The two connecting parts 105 and 107 including the plug C and the socket D, form a plug connection which is automatically plugged together during connection of the housing body 20 into the stationary part 10 and is automatically disconnected when the moving housing body 20 is moved out of the stationary part 10.

The connecting part 105 includes a socket D' which can be connected via a further plug connection to a connecting part 102 which includes a plug C'. The connecting part 102 which is inserted into a sidewall of the removable front cover 28 of the housing body 3 and is connected to the auxiliary circuit of an additional device which is provided in the recess 101 by the wiring 120. The front cover 28 closes an installation opening, which is used for installation of the switching mechanism and of the power contacts, in the moving housing body 10. The plug connection between the plug C' and the socket D' is made during closure of said front cover 28.

An analogous arrangement is provided on the opposite sidewall of the switching apparatus 1. Connecting parts 108, 106 and 111 which are constructed and arranged in a corresponding manner to the connecting parts 107, 105 and 102 make an electrical connection, in the connected position, between the electrical power supply terminals 18 and the auxiliary circuit of an additional device which is located in the recess 103.

FIGS. 2 and 3 show how the connecting part 107 is held in the seat 40. As can be seen from FIG. 3, the seat 40 has a dovetail profile. Two holding parts which are constructed as undercuts 42 are formed in mutually opposite edges in the seat 40 and two holding parts which are constructed as flexible tabs 109 are formed in the connecting part 107, which holding parts engage with one another when the connecting part 107 is pushed in as far as the rear end of the seat 40. In order to ease the required elastic deformation, the connecting part 107 is provided with one or more longitudinal slots 110.

The connecting part 105, which is held in the seat 43, is of corresponding construction.

The switching apparatus 1 is assembled as follows: with the cover 45 removed, the connecting part 105 is pushed so deeply into the seat 43 that the tabs 109 engage behind the undercuts 42. The connecting parts 106, 107 and 108 are also fixed in the associated seats in a corresponding manner. The moving housing body 20 is then closed with the front cover 28.

After this, the additional devices are positioned in the recesses 101 and 103, and the connecting parts 102 and 111 are fixed in the associated seats in the front cover 28, forming conductive connections in the side surfaces A, it being necessary to ensure that the connecting parts are inserted to a suitable depth into the seats and are fixed in the undercuts 110 by means of the flexible tabs 109. The cover 45 is then fitted.

FIG. 4 shows a switching apparatus 1 whose cover 45 projects out of a door 2 of an electrical switch cabinet. The cover 45 has an opening, which has no reference number, through which the switching lever 27 of the switching apparatus is passed. An additional device, which is constructed as an ammeter and has a digital display device 4 which continuously shows the value of the current flowing through one phase conductor of the switching apparatus 1, is fastened on the cover 45. The display device 4 is preferably able to display at least three digits. As can be seen from FIG. 5, the display device 4 can also display the measurement unit. For example, an A can be shown to indicate current as the measured variable.

Figure 5:
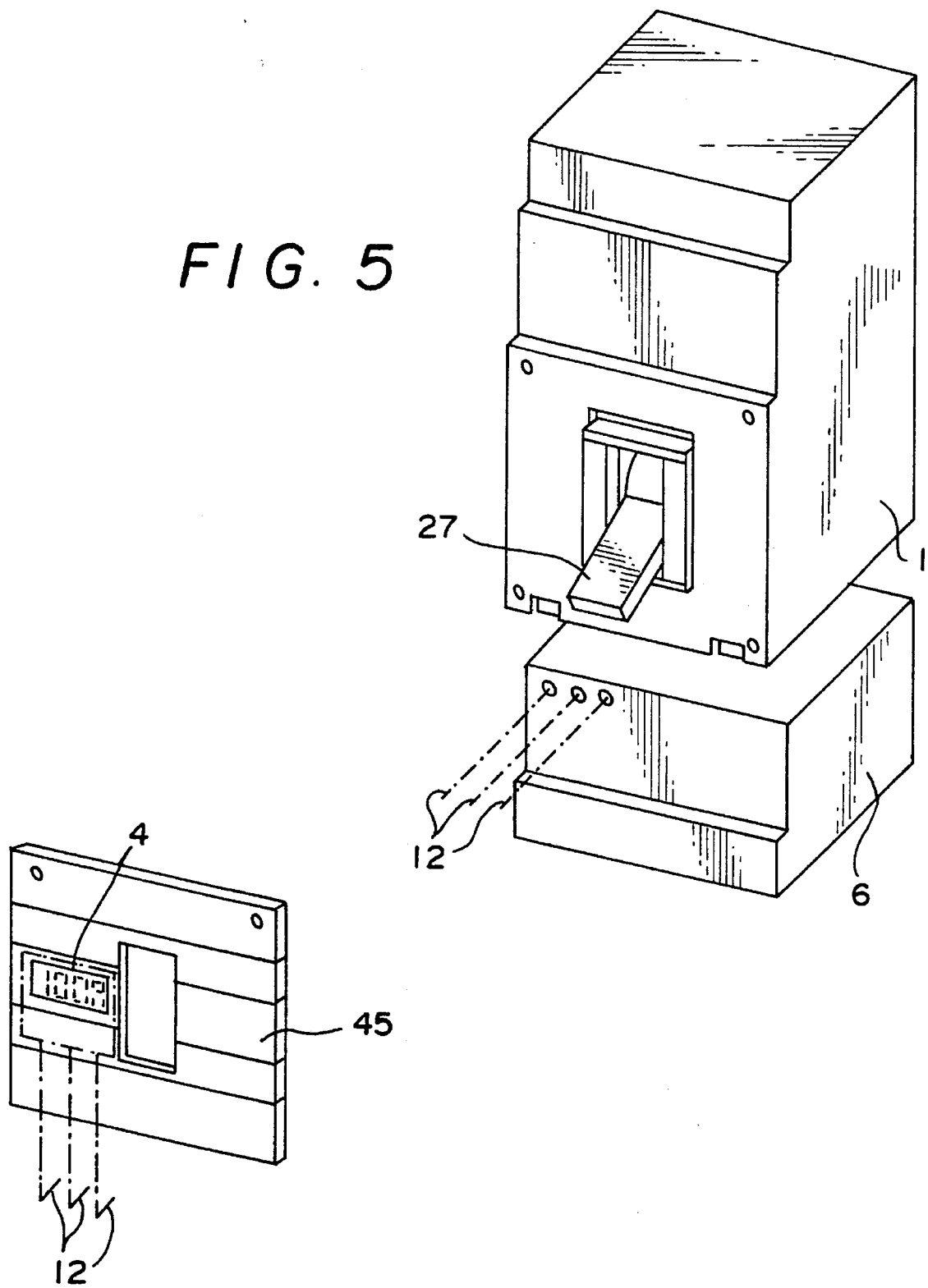
FIG. 5 shows the switching apparatus according to FIG. 4, in which the components are illustrated disconnected from one another.
Figure 6:
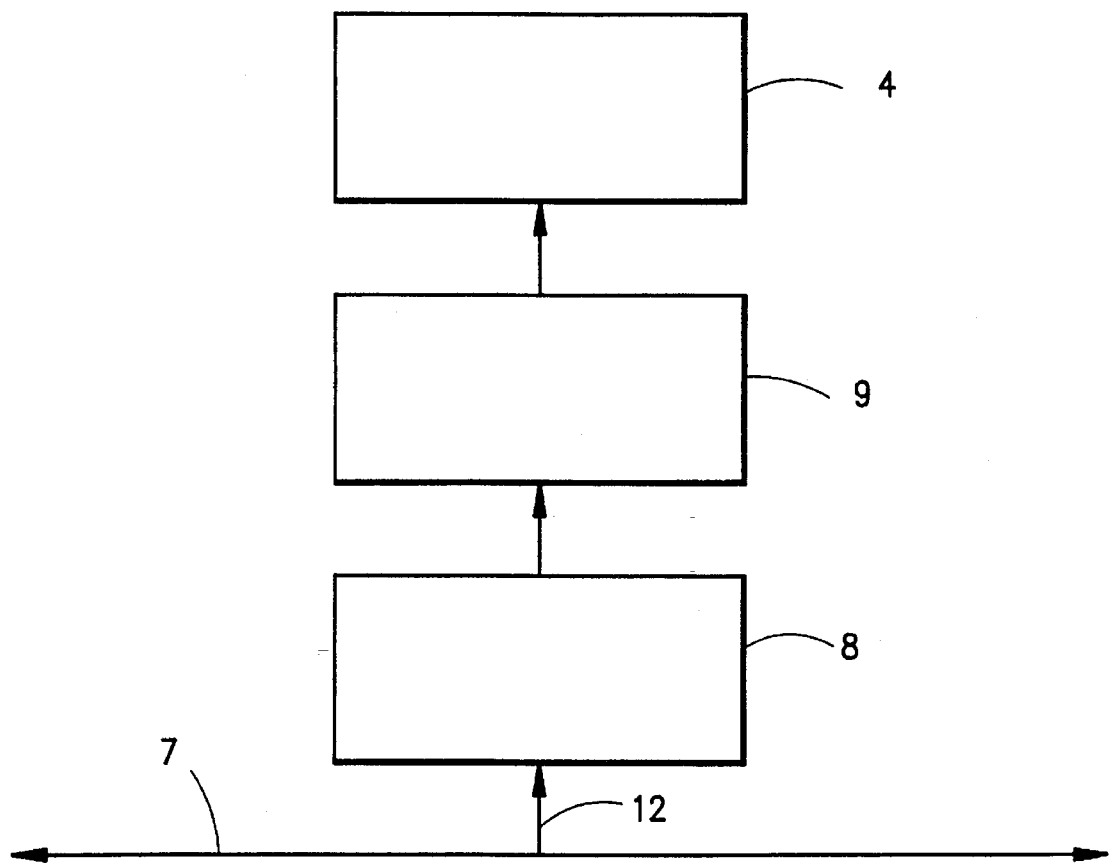
FIG. 6 shows a block diagram of the ammeter according to FIG. 4.

As is illustrated in FIG. 5, the ammeter is connected via wires 12, which can be plugged in or connected by means of terminals, to an additional device of the switching apparatus 1, which additional device is constructed as a protection unit 6. The protection unit 6 has an auxiliary circuit which cannot be seen in FIG. 5 and is supplied with electrical power via the connecting part 102, which can likewise not be seen in FIG. 5. Some of the wires 12 are electrically connected to live wires of the connecting part 102, for example by plugging in or by means of terminals, and are used for supplying electrical power to an auxiliary circuit of the ammeter. Some of the other wires 12 are connected, via a plug-in connection or terminal connection, to a data bus of the protection unit 6, which can be seen in FIG. 6.

This data bus 7 carries information relating to the current flowing in the switching apparatus 1. This information may be available both in analog form and in digitally coded form. The data bus is connected to a logic circuit 8 which is arranged on the cover 45 and is able to code and process information available on the bus 7 such that it is suitable for reproduction on the display device 4. The logic circuit 8 acts on the display device via a driver circuit 9.

The ammeter illustrated is built completely into the cover 45 and can be supplied with supply current and measurement data in a simple manner by means of the described, plug-in connecting parts. The current can also be read when the switching apparatus 1 is installed in the switch cabinet and the door 2 is closed, without any additional openings having to be created.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A switching apparatus comprising:
   a stationary part for mounting in a switch cabinet, the stationary part including power supply terminals, power distribution terminals, and first and second side walls;
   a housing body for accommodating a switch mechanism, the housing body including first and second side walls;
   wiring which passes from the stationary part to the housing body;
   a first additional device with an electrical auxiliary circuit which is supplied with electrical power from said wiring;
   means for disconnecting the moving housing body with respect to the stationary part which moves the housing body from an electrically disconnected position to an electrically connected position;
   said wiring including a first plug connection having mutually interacting parts positioned in the first and second side walls of the stationary part and in the first and second side walls of the moving housing body, said first plug connection opening during a transition from the electrically connected position to the electrically disconnected position and closing during a transition from the electrically disconnected position to the electrically connected position.

2. The switching apparatus as claimed in claim 1, wherein the first plug connection has a first connecting part for being supplied with power from the power supply terminals, and a second connecting part for electrically connecting to the auxiliary circuit.

3. The switching apparatus as claimed in claim 2, wherein the first connecting part is a plug socket located in the stationary part, and the second connecting part is a plug located into the housing body.

4. The switching apparatus as claimed in claim 3, further comprising a removable front cover attached to the housing body, the front cover having a side wall in which is disposed a third connecting part, the second connecting part is connectable via a second plug connection to the third connecting part which is electrically conductively connected to the auxiliary circuit of the first additional device.

5. The switching apparatus as claimed in claim 4, wherein at least one of the first, second and third connecting parts is accommodated in a groove formed in a side wall of one of the stationary part, the housing body and the front cover of the housing body.

6. The switching apparatus as claimed in claim 5, wherein the groove is undercut.

7. The switching apparatus as claimed in claim 6, wherein the groove has a dovetail profile in cross section.

8. The switching apparatus as claimed in claim 5, wherein undercuts are formed in the groove and are each engaged by corresponding flexible tabs provided in said at least one of the first, second and third connecting parts.

9. The switching apparatus as claimed in claim 9, wherein said at least one of the first, second and third connecting parts is provided with at least one longitudinal slot.

10. The switching apparatus as claimed in claim 1, wherein the switching apparatus is a low-voltage power switch.

11. The switching apparatus as claimed in claim 4, wherein the first additional device can be connected via a third plug connection to an auxiliary circuit of a second additional device which can be inserted into a cover of the front cover.

12. The switching apparatus as claimed in claim 11, wherein the second additional device is constructed as an ammeter and has a display device which is fastened on the cover.

13. The switching apparatus as claimed in claim 12, wherein, in addition to the display device, the cover carries auxiliary circuits which are constructed as a driver and as a control logic circuit.

* * * * *